H. H. HOLLOWAY.
ADVERTISING DEVICE.
APPLICATION FILED NOV. 17, 1908.
954,288.
Patented Apr. 5, 1910.
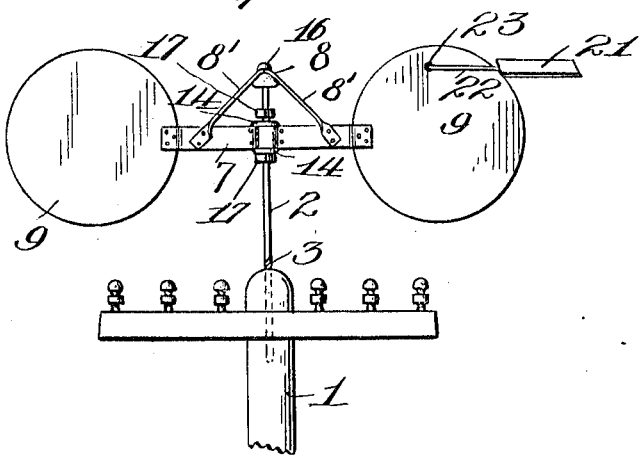
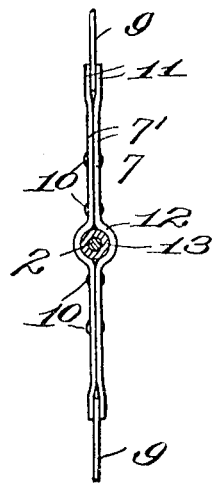
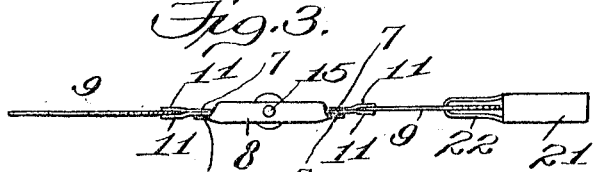
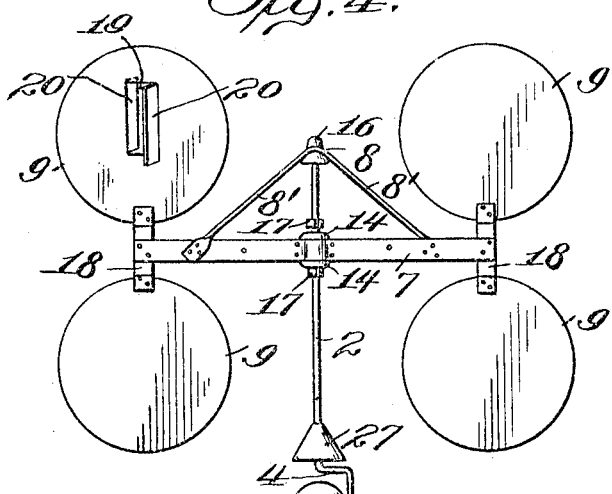
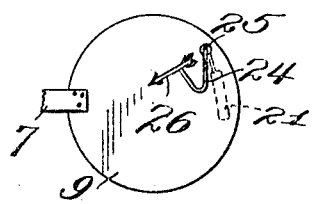
Inventor
Harry H. Holloway
By
James L. Norris
Atty.

UNITED STATES PATENT OFFICE.

HARRY HAYNES HOLLOWAY, OF BUTLER, MISSOURI.

ADVERTISING DEVICE.

954,288.   Specification of Letters Patent.   Patented Apr. 5, 1910.

Application filed November 17, 1908. Serial No. 463,049.

*To all whom it may concern:*

Be it known that I, HARRY HAYNES HOLLOWAY, a citizen of the United States, residing at Butler, in the county of Bates and State of Missouri, have invented new and useful Improvements in Advertising Devices, of which the following is a specification.

This invention relates to new and useful improvements in advertising devices and has more particular reference to an advertising device in the nature of a wind actuated sign which may be supported on telegraph or other poles of like character, or in conspicuous out-of-door places.

In connection with an advertising device of the above type, the invention has as a primary object the provision of a construction which includes novel suspension parts having means to insulate the metallic parts of the sign from the supporting member.

The invention has as a further object the provision of a sign which has a pivotal mounting and oscillates in a wind or breeze, novel bearing and suspension means being provided in this connection.

The invention has as a further object the provision of a sign of the general character noted which may be inexpensively manufactured and consequently be of general use, and the structure includes such a novel combination and arrangement of parts as permits of the sign being readily set up or dismantled.

The structural details will be explained at length in the following description which is to be read in connection with the annexed drawings wherein are illustrated preferred and advantageous embodiments of the invention, while the novel features of the improvement will be defined in language of the proper determinative scope in the claims appended at the end of the specification.

In the accompanying drawings:—Figure 1 is an elevation illustrating the improved advertising device assembled for use and supported from a suitable pole such as a telegraph pole. Fig. 2 is an enlarged horizontal section illustrating the supporting arms which carry the wind vanes. Fig. 3 is a plan view of the improved sign. Fig. 4 is an elevation showing certain modifications and attachments which will be set forth hereinafter. Fig. 5 is an elevation of a wind vane provided with a vibratory pointer which serves the purpose of attracting the attention of passers by. Fig. 6 is a detailed sectional view illustrating the assemblage of a cone shaped bearing part included in the invention.

Similar characters of reference refer to similar parts throughout the several views.

In order that my improvement may be capable of general use and to avoid prohibitory expense, it is preferred to utilize telegraph poles or the like as supporting means and such a pole is indicated in Figs. 1 and 4 by the numeral 1. The sign proper is supported directly by and upon a rod 2 which in the form of the invention shown in Fig. 1 projects axially from the upper end of the post 1 and has its lower end formed as a lag screw 3 for engagement in said post. In the form of the invention shown in Fig. 4 the rod 2 has its lower end portion off set as at 4, the extension thus formed being secured to the post 1 through the agency of binding clips 5 having attachment screws 6 which are engaged with the rod 2 in a well known manner.

The sign proper comprises a main bar 7, a hanger bar 8 and wind vanes 9, the latter being utilized for display purposes and having suitable advertising data thereon. The main bar 7 comprises two metallic sections 7' as illustrated more particularly in Fig. 2. These sections 7' lie flat against one another in a vertical plane and are held together by rivets or other fastenings 10. The outer ends of the sections 7' are slightly spaced and are bent angularly in parallel planes to constitute clips 11, the latter carrying the vanes 9 which have portions disposed between the angular extensions forming said clips and secured by suitable fastenings. The sections 7' are oppositely curved at their centers as at 12, the curved central portions 12 together forming a substantial cylindrical body which incloses a bushing 13 of insulating material such as glass. The bushing 13 surrounds the rod 2 and is provided at its ends with outturned flanges 14 which serve to hold said bushing from axial displacement with respect to the bar 7.

The hanger bar 8 is of substantial inverted V-shape and comprises two downwardly diverging legs 8', the ends of such legs being twisted angularly into the plane of the bar 7 and secured thereto. The bar 8 at a central point and at the junction of the legs 8' is formed with an opening 15 through which projects the apex of a hollow cone-shaped bearing 16, preferably of insulating material. The lower portion of the bearing 16 abuts against the inner faces of the legs 8' and seats upon the upper end of the rod 2, the said upper end being preferably pointed in order to reduce friction.

Means are provided for holding the sign against accidental displacement from the rod 2 and such means preferably comprises set nuts 17 which are threaded upon said rod and which are arranged above and below the bar 7. The nuts 17 serve as positive stops to hold the sign against complete axial displacement, but they may be adjusted to permit of a limited degree of axial play for the purpose of preventing binding and of allowing of the easy oscillation of the sign.

In the construction shown in Fig. 1 the vanes 9 are illustrated as applied directly to the bar 7. In order, however, that the number of said vanes may be increased without necessitating the use of additional parts, said vanes may be assembled in the manner shown in Fig. 4, in which the bar 7 is provided at its ends with vertical members 18 which project above and below said bar and are formed at each end with clips for engagement with the vanes 9. Thus in Fig. 1 a single series of vanes is shown while in Fig. 4 two series of vanes are shown, an upper series and a lower series.

While but a single bar 7 has been shown, it is obvious that a number of such bars may be employed if it is desired to increase the number of vanes in a single or double series.

In addition to the sign constructed generally as above described, the invention also includes certain adjuncts which will now be described.

In Fig. 4 one of the vanes 9 is shown as having a central opening 19 preferably of rectangular form and as having vertical blades 20 struck out in opposite directions from the side edges of said opening, the blades 20 adding to the distinctive appearance of the vane and serving to afford an increased wind resisting surface.

In Fig. 3 another adjunct is shown in the nature of a wind actuated vibratory tapper which in its vibrating action makes an incessant tapping noise or ringing of the vane and thereby serves to attract attention to the sign. Such tapper comprises a metallic part 21 which rests against the edge of the vane and is carried by a U-shaped yoke 22 which is passed through an opening 23 formed in the vane. The part 21, owing to its light construction and loose mounting, is rapidly vibrated by wind pressure and incident to the rapid oscillation of the sign.

Another advantageous adjunct is illustrated in Fig. 5, in which a wire member 24 is shown as passed loosely through an opening 25 provided in the vane near its edge, the member 24 carrying a pivoted pointer 26, which, owing to its light construction, is readily susceptible to vibratory influence and has vibration when the sign is rapidly oscillating, the pointer 26 serving to call attention to the subject-matter of the advertisement. The member 24 carries on the opposite side of the vane a flat metallic piece 21 which serves to catch the wind or breeze and to thereby effect vibration of said member.

In Fig. 4 the rod 2 is shown as provided near its lower end with a cone-shaped hood 27 which serves to protect the post 21 from the elements and more particularly from water which collects upon and trickles down the rod 2.

The provision of the insulated bearing parts as the bushing 13 and the cone bearing 16, is of material advantage in arresting lightning and thus protecting the sign and the post 1.

The manner of constructing the bar 7, and the specific formation of the hanger bar of inverted V-shape materially strengthens the structure and serves the purpose of inexpensiveness while at the same time providing for an efficient operation by centering the parts with relation to the supporting rod 2, and by allowing of the employment of the antifriction bearings. The provision of the nuts 17 is also of material consequence since revolving or oscillating sign structures have an up and down play to a greater or less degree and as usually constructed it is necessary to provide thrust bearings to take up such play. This play is utilized to transmit vibratory movement to the tapper 21 and the pointer 26.

Having fully described my invention, I claim:—

1. In sign structures of the type set forth, in combination, a main bar provided at its ends with wind vanes and having a cylindrical central portion, a hanger bar of inverted V-shape having its ends secured to said main bar, a supporting rod passed through said cylindrical central portion, a cone shaped bearing part associated with said hanger bar at a point central thereof and engaging said supporting rod, said bearing part being of insulating material, and an insulating bushing inclosed in said cylindrical portion and surrounding said rod.

2. In sign structures of the type set forth, in combination, a main bar carrying a wind vane and having a cylindrical portion, a hanger bar connected to said main bar, a supporting rod passed through said cylindrical portion, said hanger bar having an opening in the upper portion thereof, and a cone-shaped bearing fitted into said opening and receiving the end of said supporting rod.

3. In sign structures of the type set forth, in combination, a main bar carrying a wind vane and having a cylindrical portion, an insulating bushing disposed in said cylindrical portion, a hanger bar provided in its upper portion with an opening and having its lower end attached to said main bar, an insulating cone-shaped bearing fitted into said opening and a supporting rod passed through said bushing and having its end received in said bearing.

4. In sign structures of the type set forth, in combination, a supporting rod, a main bar comprising two flat metallic sections secured together and shaped at their centers to form a cylindrical portion surrounding said supporting rod, wind vanes carried by said main bar at the ends thereof, a hanger bar of inverted V-shape having its ends attached to said main bar and having a central opening in its upper portion, and a bearing member fitted in said opening and receiving the upper end of said supporting rod.

5. In sign structures of the type set forth, in combination, a supporting rod, a hanger pendent from the upper end thereof, said hanger having an opening in its upper portion, a cone-shaped bearing fitted into said opening and engaging the end of said supporting rod, a sign plate and means connecting the sign plate and said hanger.

6. In sign structures of the type set forth, in combination, a rotatable display part having an opening, a member having an end engaged loosely and pivotally through said opening, and a vibratory tapper carried by said member and engaging said display part.

7. In sign structures of the type set forth, in combination, a vane and means for supporting the vane for oscillation, said vane having an opening and having blades struck out in opposite directions from the edges of said opening.

In testimony whereof I have hereunto set my hand in presence of two subscribing witnesses.

HARRY HAYNES HOLLOWAY.

Witnesses:
 GRACE C. WALKER,
 J. B. WALTON.